United States Patent
Farrugia et al.

(10) Patent No.: US 9,080,012 B2
(45) Date of Patent: Jul. 14, 2015

(54) ONE-POT, NEAT RING OPENING POLYMERIZATION TO PREPARE RESIN

(71) Applicants: Xerox Corporation, Norwalk, CT (US); National Research Council of Canada, Ottawa (CA)

(72) Inventors: Valerie M Farrugia, Oakville (CA); Andrew J Myles, Edmonton (CA); Karen A Moffat, Brantford (CA); Jordan H Wosnick, Toronto (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/938,257

(22) Filed: Jul. 10, 2013

(65) Prior Publication Data

US 2015/0018497 A1    Jan. 15, 2015

(51) Int. Cl.
*C08G 63/08* (2006.01)
*C08G 63/82* (2006.01)
*C08G 63/78* (2006.01)
*C08L 67/04* (2006.01)

(52) U.S. Cl.
CPC .............. *C08G 63/823* (2013.01); *C08G 63/08* (2013.01); *C08G 63/78* (2013.01); *C08L 67/04* (2013.01)

(58) Field of Classification Search
CPC ...... C08G 63/08; C08G 63/78; C08G 63/823; C08L 67/04
USPC .................. 525/410, 411, 413, 415, 450, 466
See application file for complete search history.

(56) References Cited

U.S. PATENT DOCUMENTS

2009/0281068 A1 * 11/2009 Moller et al. ................. 514/152
2011/0151566 A1 * 6/2011 Hedrick et al. ............... 435/455

OTHER PUBLICATIONS

Kadota, J., et al.; Macromolecules, 2010, p. 8874-8879.*
Beilke, T.L.; Melt Polymerization of Lactide Using Biocompatible Materials, 2010, p. ii-64.*

* cited by examiner

*Primary Examiner* — Robert Jones, Jr.
(74) *Attorney, Agent, or Firm* — MDIP LLC (57) ABSTRACT

The instant disclosure describes a ring opening polymerization (ROP) of cyclic monomer components using a nucleophilic transesterification catalyst system in a neat, single pot reaction to obtain homopolymers and copolymers.

20 Claims, 2 Drawing Sheets

ONE-POT, NEAT RING OPENING POLYMERIZATION TO PREPARE RESIN

FIELD

The present disclosure generally is directed to polyester synthesis processes and, more specifically, to processes of ring opening polymerization (ROP) of cyclic monomers using an organic nucleophilic transesterification catalyst in the absence of a solvent to obtain, for example, ROP-based homopolymers and copolymers.

BACKGROUND

ROP of lactones and lactides is an addition polymerization reaction where the terminal end of a polymer acts as a reactive center and cyclic monomers join at that site to increase the length of a larger polymer chain. In the case of a polylactide, an alkoxide of a metal having d orbitals, such as, aluminum or tin, can be used as an initiator of ROP of lactide (see, e.g., Biopolymers from Renewable Resources, Hartmann et al. (eds.), 1998, Spring-Verlag, Berlin, herein incorporated by reference in entirety). Stannous octoate or tin(II) bis-2-ethylhexanoic acid are catalysts that can be used for bulk polymerization of lactide because of solubility in lactide, good reaction rate, high conversion, racemization of less than 1% and synthesis of higher molecular weight polymers (see, e.g., Du et al., Macromolecules (1995) 28(7):2124, herein incorporated by reference in entirety).

Metal-free purely organic catalysts using either tertiary amines or phosphines as nucleophilic transesterification catalysts are known (see, e.g., Nederberg et al., Agnew Chem Int Ed (2001) 40:2712; Nederberg et al., Chem Comm (2001) 2006; and Kamber et al., Chem Rev (2007) 107:5813, each herein incorporated by reference in entirety).

A new class or organocatalysts for ROP is the N-heterocyclic carbenes (NHCs) studied in the polymerization of ε-caprolactone to provide polycaprolactones with controlled molecular weight and low polydispersity (see, e.g., Kamber et al., Macromolecules (2009) 42(5):1634, herein incorporated by reference in entirety).

All of those processes rely on stringent anhydrous conditions and many involve reactions under pressure with solvent.

Polylactide was may be copolymerized with a number of different monomers including other lactone monomers, such as, glycolide and caprolactone. Block copolymers of polycaprolactone and polylactide may be prepared in two possible ways: one, a sequential addition of the required monomer on the living growing chain end of the first monomer; and two, by making a prepolymer with a hydroxyl end group to which the second monomer may be added in the presence of a catalyst (see, e.g., Bero et al., Polym Bull (1993) 21:9; and Veld et al., J. Poly Sci Part A Polym Chem (1997) 35:219, each herein incorporated by reference in entirety).

The reactivity of lactone monomers is much lower than that of lactide monomers which generally excludes using lactones in one-pot processes. There remains a need to generate lactone/lactide block copolymers in a single process format.

SUMMARY

The present disclosure provides methods for producing polyester polymer resins in a single process format (i.e., one-pot), including a method which uses an organic nucleophilic transesterification catalyst that facilitates ROP of, for example, cyclic ester and/or cyclic diester monomers in the absence of a solvent to prepare homopolymers and copolymers.

In embodiments, an ROP process is disclosed comprising contacting a first cyclic component and optionally one or more additional cyclic components with a catalyst and an initiator; and polymerizing the first cyclic component and optional one or more additional cyclic components to form a first homopolymer or copolymer resin; where the polymerization is conducted under neat conditions in a single vessel.

In embodiments, the homopolymer is an intermediate and is used in forming a block copolymer by addition of a second cyclic component thereto along with an organic nucleophilic transesterification catalyst that facilitates ROP of the second monomer as a block attached to the homopolymer comprising the first monomer to product a block copolymer.

In embodiments, a process is disclosed including contacting a first cyclic component and a second cyclic component with a catalyst and an initiator, and polymerizing the first cyclic component and second cyclic component to form a copolymer resin, where the first and second cyclic components comprise, but are not limited to, glycolide, β-propiolactone, β-butyrolactone, γ-butyrolactone, γ-valerolactone, γ-valerolactone, γ-caprolactone, trimethylenecarbonate (TMC), 2-benzyloxy-trimethylenecarbonate (BTMC), 2-hydroxy-trimethylenecarbonate (TMCOH), 4-(benzyloxymethyl)-1,3-dioxolan-2-one (BDMC), 4-(hydroxymethyl)-1,3-dioxolan-2-one (DMCOH), 2-oxy-trimethylenecarbonate (OTMC), dehydrotrimethylenecarbonate (DHTMC) and 2,2-methoxy trimethylene carbonate (TMC(OMe)$_2$), succinic anhydride, glutaric anhydride, maleic anhydride, trimethylene carbonate, carboxytrimethylene carbonate and esters thereof, styrene oxide, cyclohexene oxide, 4-(sulfonatophenyl)caprolactone, cyclopentane-1,2-dicarboxylic anhydride, cyclohexene-1,2-dicarboxylic anhydride, 2,3-bicyclo[2,2,2]octadicarboxylic anhydride, phthalic anhydride, naphthalene-dicarboxylic anhydride, pyridine-dicarboxylic anhydride, thiophene-dicarboxylic anhydride, cyclohexene oxide, L,L-lactide, D,D-lactide, D,L-lactide and combinations thereof; wherein the polymerization is carried out under neat conditions in a single vessel under standard pressure and ambient humidity.

BRIEF DESCRIPTION OF THE DRAWINGS

Various embodiments of the present disclosure are described with reference to the figures listed below.

DETAILED DESCRIPTION

Figure 1:
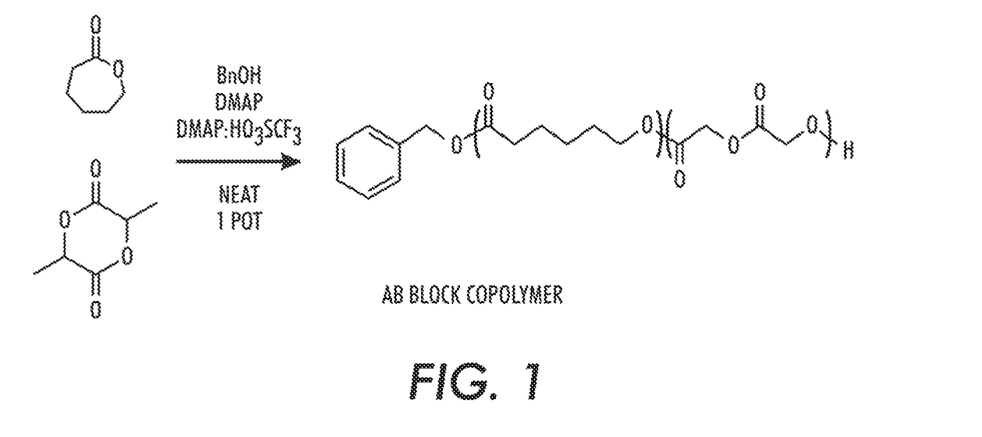
FIG. 1 shows an illustration of polymer backbones for an AB block copolymer. BnOH is benzyl alcohol.

The present disclosure relates to polymerization processes, including one-pot processes in the absence of a solvent, for the production of low polydispersity polylactones and polylactides (PLA), as well as controlled block copolymerization of lactide and lactone monomers. In embodiments, for example, AB block copolymerization processes are disclosed using aliphatic polyesters as monomers, where poly(caprolactone) may be a crystalline block A and racemic poly(lactide) may be an amorphous block B, as illustrated in FIG. 1. The composition of the polymer or copolymer is determined by the timely use of monomer or monomers in the reaction as a design choice.

Figure 2:
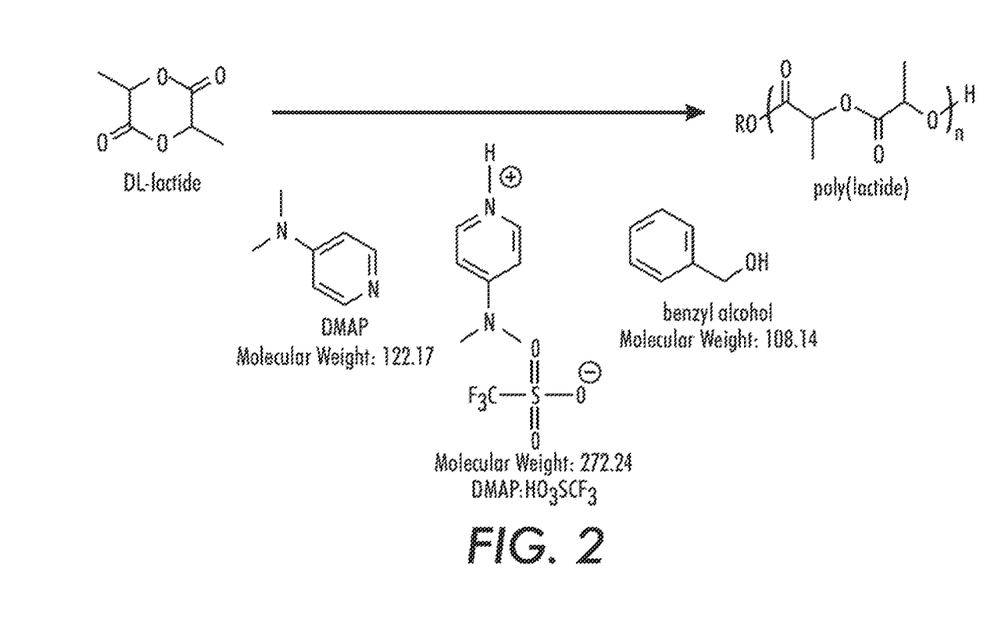
FIG. 2 shows an illustration of a DL-lactide reaction scheme.

The process uses neat conditions (i.e., no added solvent or cosolvent), in the absence of anhydrous conditions (e.g., may be conducted ambient humidity), without an inert gas blanket or under pressure (e.g., may be conducted under standard pressure of 1 atmosphere) using an organic nucleophilic transesterification catalyst; e.g., 4-(dimethylamino)pyridine (DMAP) see, e.g., FIG. 2) to make, for example, polylactide, polycaprolactone, polycaprolactone-b-polylactide and associated copolymers with high conversion and low polydispersity. Other organic molecules, such as, 4-pyrrolidinopyridine (PPY) and phosphines, promote ROP of cyclic monomers in the presence of a suitable nucleophilic initiator (see, e.g., Myers et al., J Polym Sci Part A: Polym Chem (2002) 40:844; Nederberg et al., Agnew Chem Int Ed (2001) 40:2712; and Biela et al., Makromol Chem (1983) 184:811, each herein incorporated by reference in entirety).

For the purposes herein, "neat," is means to indicate in the absence of a solvent, without the need for a solvent and so on, wherein the reactants are mixed and the polymerization reaction sua sponte ensues in the presence of the catalyst and initiator.

In embodiments, processes of the present disclosure may be utilized to produce homopolymers, copolymers, such as, block copolymers, such as, block copolymers including distinct crystalline polyester blocks and distinct amorphous polyester blocks and so on, for example, by the selected and sequential use of monomers in the reaction to build a block copolymer composed of a series of blocks added to the growing polymer chain by the limiting and choice of sequential addition of monomer to the reaction. By suitable choice of monomers and block sizes, polyesters containing one or more amorphous blocks linked to one or more crystalline blocks can be prepared.

In embodiments, other starting materials beside lactones and lactides may be utilized to form the desired block copolymers. For example, the ring opening copolymerization of cyclic anhydrides, cyclic carbonates, epoxides and combinations thereof, may also be used to form polymers and copolymers of the present disclosure. Also, more than two cyclic monomers can be used, and a non-cyclic monomer can be included so long as the ring opening reaction is not impacted negatively.

Resins

As to the cyclic components polymerizable by ROP, the cyclic monomers or dimers of aliphatic hydroxycarboxylic acids may be used. Examples include, but are not limited to, lactide, β-propiolactone, β-butyrolactone, γ-butyrolactone, γ-valerolactone, γ-valerolactone, glycolide, ε-caprolactone and the like.

In the case of asymmetric carbon atoms within a hydrocarboxylic acid unit, each of the D-form and the L-form, as well as mixtures of both may be used. Racemic mixtures can also be used. By way of example, meso lactide is the dimer made of one D-lactic acid and one L-lactic acid. D,L-lactide designates a racemic mixture of D,D-lactide and L,L-lactide.

Other cyclic components polymerizable by ROP include cyclic carbonates, such as, 5-membered to 7-membered cyclic carbonates. In embodiments, the polymerization process may be operative with 6-membered cyclic carbonates. In embodiments, cyclic components may include trimethylenecarbonate (TMC), 2-benzyloxy-trimethylenecarbonate (BTMC), 2-hydroxy-trimethylenecarbonate (TMCOH), 4-(benzyloxymethyl)-1,3-dioxolan-2-one (BDMC), 4-(hydroxymethyl)-1,3-dioxolan-2-one (DMCOH) and so on. Cyclic carbonates may include 2-oxy-trimethylenecarbonate (OTMC), dehydrotrimethylenecarbonate (DHTMC) and 2,2-dimethoxy trimethylene carbonate (TMC(OMe)$_2$).

Other cyclic components may include cyclic anhydrides, cyclic carbonates, epoxides, combinations thereof and the like. Suitable cyclic anhydrides include, but are not limited to, aliphatic dicarboxylic anhydrides, such as, succinic anhydride, glutaric anhydride, maleic anhydride and combinations thereof. Suitable cyclic carbonates include, but are not limited to, trimethylene carbonate, carboxy-trimethylene carbonate and esters thereof, combinations thereof and the like. Examples of epoxides include stryene oxide, cyclohexene oxide, combinations thereof and the like.

As noted above, in embodiments, the starting materials, such as, lactones, may be chosen such that one of the formed blocks may be amorphous and the other may be crystalline as a design choice.

Examples of lactones that produce amorphous polyesters in ROP include 4-tert-butylcaprolactone, 4-phenylcaprolactone, 4-methylcaprolactone and isomers, 3,5-dimethylcaprolactone and isomers, 3-isochromanone, lactide, glycolide, 4-(sulfonatophenyl)caprolactone, cyclic anhydrides, such as, cyclopentane-1,2-dicarboxylic anhydride, cyclohexene-1,2-dicarboxylic anhydride and 2,3-bicyclo[2,2,2]octadicarboxylic anhydride and so on.

Examples of aromatic dicarboxylic anhydrides include phthalic anhydride, naphthalene-dicarboxylic anhydride, pyridine-dicarboxylic anhydride, thiophene-dicarboxylic anhydride, cyclic carbonates, epoxides, such as, styrene oxide and derivatives, cyclohexene oxide, combinations thereof and the like.

In embodiments, caprolactone, D,D lactide, L,L lactide and so on can be used for crystalline blocks of copolymers or crystalline polymers. Crystalline polymers are known and suitable cyclic monomer reagents for making such crystalline oligomers and polymers can be used, following the guidance provided herein for the ROP process of interest.

Catalysts

In embodiments, the ROP of interest may take place in the presence of a catalyst. Suitable catalysts include organic nucleophilic transesterification catalysts. In embodiments, the catalysts may mediate ROP by a quasi-living polymerization mechanism making the catalysts suitable for the formation of block copolymers with chemically distinct blocks. In embodiments, such catalysts include 4-(dimethylamino)pyridine (DMAP)-DMAP:HX catalysts, where HX includes mineral acids, such as, HCl, HBr, sulfuric acid, nitric acid, phosphoric acid or the like, organic acids, such as, formic acid, acetic acid, trifluoroacetic acid, trichloroacetic acid, methyl sulfonic acid, triflic acid or the like, or mixtures or combinations thereof. In embodiments, the catalyst is a two component organic transesterification system comprising DMAP and DMAP:HO$_3$SCF$_3$ (triflic acid), see, for example, Kadota et al., Macromolecules 43(21)8874-8879, 2010.

The catalyst should operate at temperatures of from about 100° C. to about 170° C., from about 135° C. to about 165° C., from about 150° C. to about 160° C., although temperatures outside those ranges may be utilized.

Same or different catalyst may be utilized to form a crystalline block and an amorphous block.

In embodiments, the amount of catalyst may be from about 0.01% by weight to about 10% by weight based on the starting materials used to generate the copolymer polyester resin, from about 0.05% by weight to about 8%, from about 0.1% by weight to about 6%, although amounts outside those ranges may be utilized.

Initiators

In embodiments, the ROP may take place in the presence of an initiator. Initiators include monohydric organic alcohols (i.e., monoalcohols).

In embodiments, such monoalcohols generally include organic alcohols having from 1 to about 40, from about 1 to about 18 carbon atoms; polymeric alcohols; tetrafluoroethylene-based telomer alcohols and so on. Examples of monoalcohols include the various aliphatic and aromatic alcohols, and the like, such as, alkyl alcohols, for example, methyl alcohol, ethyl alcohol, propyl alcohol and the like, olefinic alcohols, for example, allyl alcohol an the like, alicyclic alcohols, for example, cyclohexanol and the like, heterocyclic alcohols, for example, furfuryl alcohol, and the like, and so on. Various aromatic alcohols include benzyl alcohol and the like. Moreover, halogenated organic alcohols, such as, fluoroalcohols having from 2 to 18 carbon atoms may be used, such as, trifluoroethanol, heptafluorobutanol, heptadecylfluorooctanol and the like. In embodiments, monohydric alcohols include benzyl alcohol, trifluoroethanol, heptafluorobutanol, pentafluoropropanol, pentafluorobutanol, nonafluorohexanol, various perfluoroalkylethanols and allyl alcohol.

The monoalcohols should operate at temperatures of from about 100° C. to about 170° C., from about 135° C. to about 165° C. from about 150° C. to about 160° C. although temperatures outside those ranges may be utilized.

Same or different monoalcohols may be utilized to form a crystalline block and an amorphous block.

In embodiments, the amount of monoalcohol may be from about 0.01% by weight to about 10% by weight based on the starting materials used to generate the copolymer polyester resin, from about 0.05% by weight to about 8%, from about 0.1% by weight to about 6%, although amounts outside those ranges may be utilized.

In embodiments, polyester homopolymers may be used as initiators, for example, in embodiments, the initiator may be polycaprolactone or polylactide.

Reaction Conditions

The polymer component starting materials may be combined with a catalyst of interest and an initiator of interest, and a polyester may be formed. The polymerization may be performed in the absence of solvents.

In the polymerization process, the reactants may be added to a suitable reactor, such as, a mixing vessel. The appropriate amount of starting materials may be added to a catalyst and an initiator, and a polyester homopolymer or block copolymer formed.

A homopolymer can be synthesized using a single cyclic reactant.

A copolymer can be synthesized using a first cyclic reactant and either a second cyclic reactant or a non-cyclic reactant. In embodiments, the copolymer can be an alternating copolymer or a block copolymer by adjusting the relative amounts of the reagents, adjusting the timing of addition of the reagents into the single vessel or both. The selective timing and amount of an added reactant determines, in the case of a block copolymer, the length of a first block, the length of a second block and so on. Hence, a block copolymer can comprise two blocks, three blocks or more as a design choice.

In embodiments, more than two species of monomer can be included in a reaction. Hence, a reaction can comprise a first and a second cyclic reactant, and one or more additional cyclic reagents, or one or more non-cyclic monomers, as a design choice.

Formation of the blocks is sequential. For example, in some embodiments, a catalyst, an initiator and starting material may be utilized to form one of the blocks and once the block is formed, starting materials utilized to form the second block are added. In such a case, the starting material for one of the blocks, sometimes referred to herein as a first component, may be contacted with a catalyst and initiator, followed by polymerizing the first component to form a first block of a copolyester resin. The first block may then be contacted with the starting material utilized to form a second block of the copolyester, sometimes referred to herein as a second component, followed by polymerizing the second component to form a second block of the copolyester resin linked to the first block. The initiator and/or catalyst of the first and second components may be the same for both components. The resulting copolyester resin, which may include a crystalline block and an amorphous block, may then be recovered.

Thus, for example, in embodiments, starting material(s) for forming a crystalline block, sometimes referred to herein as the precursor(s) of the crystalline block, may first be combined with a catalyst and an initiator to form the crystalline block, followed by the addition of the starting material(s) for the formation of the amorphous block, sometimes referred to herein as the precursor(s) of the amorphous block, and optionally with additional or different catalyst and/or initiator, and the subsequent formation of the amorphous block. In embodiments, the order of formation of the blocks may be reversed, i.e., formation of an amorphous block by combining the starting materials/precursors with a catalyst and an initiator, followed by formation of a crystalline block by the addition of the appropriate starting materials/precursors, and optionally with additional or different catalyst and initiator.

The starting materials may be at a monomer:catalyst/initiator ratio of from about 5:1 in mmoles to about 50:1 in mmoles, from about 6:1 to about 45:1, from about 7:1 to about 40:1, where the catalyst/initiator amount represents an aggregate amount of the catalyst(s) and initiator (e.g., 0.28 mmoles DMAP [catalyst] or 0.28 mmoles DMAP:$HO_3SCF_3$ [catalyst], and 0.28 mmoles benzyl alcohol [initiator]), although amounts outside those ranges may be used.

As noted above, multiple lactides, lactones, cyclic anhydrides, cyclic carbonates and/or epoxides may be utilized in forming a crystalline block in the resulting copolymer, and at least one other lactide/lactone may be utilized in forming an amorphous block in the resulting copolymer. Suitable starting materials (e.g., cyclic components, catalysts and initiators) may be those as described above, or purchased or developed as a design choice.

The time for the reaction may depend on the type and amount of starting materials utilized, the amount of catalysts utilized, the temperature of the reaction and the like. The reaction mixture may be mixed for from about 1 min to about 72 hrs, from about 10 min to about 24 hrs (although times outside those ranges can be used), while keeping the temperature within the operational range of the catalyst being used, from about 100° C. to about 165° C., from about 100° C. to about 135° C., from about 135° C. to about 150° C., from about 150° C. to about 165° C., although temperatures outside those ranges may be used.

Those skilled in the art will recognize that optimization of reaction conditions, temperature, initiator loading and catalyst loading may be varied to generate polyester polymers of various molecular weight, and that structurally related starting materials may be polymerized using comparable techniques as a design choice.

The resins thus produced may include crystalline blocks having a glass transition temperature (Tg) of from about −60° C. to about 200° C., from about −50° C. to about 150° C., and a melting temperature of from about 20° C. to about 200° C., from about 55° C. to about 95° C. The resins thus produced may also include amorphous blocks having a Tg of from about 0° C. to about 200° C., from about 5° C. to about 150° C.

The polymers or copolymers resulting from the reaction can be of any size depending of the reaction conditions, such as, the length of reaction, as a design choice. Hence, a polymer or copolymer of interest may have an $M_n$, as measured by GPC, of from about 800 to about 20,000, from about 1,000 to about 15,000, and an $M_w$ of from about 950 to about 50,000, from about 1,000 to about 17,000, as determined by GPC. The $M_w/M_n$ of the copolymer may be, for example, from about 1.01 to about 1.5, from about 1.05 to about 1.3. In embodiments, the polydispersity index (PDI) may be less than about 1.4, less than about 1.3, less than about 1.2.

The resulting copolymer may possess crystalline blocks in amounts of from about 1 to about 90% by weight of the block copolymer, from about 5 to about 30% by weight of the block copolymer, and amorphous blocks in amounts of from about 10 to about 99% by weight of the block copolymer, from about 70 to about 95% by weight of the block copolymer.

The weight of the resulting polymers may depend on the starting materials, reaction conditions and the catalyst being used. Higher temperatures, in embodiments, about 135° C. or above, and longer reaction times, for example, of about 24 hours, about 48, or more hours, may yield polymers with higher molecular weight or degree of polymerization (DP).

Uses

The polymerization synthesis according to the present disclosure may be used to prepare polyester resins for subsequent use in any of a variety of known polyester method and products as known in the art. The disclosed synthesis also provides for reduced reaction times and energy cost. Hence, the resulting polyester polymer can be found in materials, cloths, fibers, other plastic products and so on, as known in the art. Some forms of toner used in electrophotography comprise one or more polyester polymers.

In addition, lactones suitable for polymerization are commonly available as lactones are used in other industries, for example, as fragrances, food additives and the like. Moreover, lactones and lactides are biodegradable and hence, reduce reliance on petroleum products.

Toner

The homopolymer or block copolymer resin described above may be utilized to form toner compositions. Toner compositions may include a polyester resin as taught herein and may also include optional colorant, waxes and other additives as known in the art. Toners may be formed utilizing any method within the purview of those skilled in the art, such as, emulsion/aggregation techniques.

Resins

Any of a variety of polyester resins as known can be used in a toner. One or more of the resins used in a toner is made as taught herein.

Surfactants

In embodiments, colorants, waxes and other additives utilized to form toner compositions may be in dispersions including surfactants. Moreover, toner particles may be formed by emulsion aggregation methods where the resin described above and other components of the toner are mixed with one or more surfactants, an emulsion is formed, toner particles are aggregated, coalesced, optionally washed, dried and recovered.

One, two or more surfactants may be utilized. The surfactants may be selected from ionic surfactants and nonionic surfactants. Anionic surfactants and cationic surfactants are encompassed by the term, "ionic surfactants." The surfactant may be utilized in an amount of from about 0.01% to about 5% by weight of the toner composition, although amounts outside that range may be utilized.

Colorants

Various known suitable colorants, such as, dyes, pigments, mixtures of dyes, mixtures of pigments, mixtures of dyes and pigments, and the like, may be included in the toner. The colorant may be included in the toner in an amount of, for example, about 0.1 to about 35% by weight of the toner, although amounts outside that range may be utilized.

Mention may be made of carbon black, such as, REGAL 330™ magnetites, such as, Mobay magnetites MO8029™, MO8060™ Columbian magnetites; MAPICO BLACKS™ and surface treated magnetites; Pfizer magnetites CB4799™, CB5300™, CB5600™, MCX6369™ Bayer magnetites, BAYFERROX 8600™, 8610™ Northern Pigments magnetites, NP-604™, NP-608™ Magnox magnetites TMB-100™ or TMB-104™ and the like. As colored pigments, there can be selected cyan, magenta, yellow, red, green, brown, blue or mixtures thereof.

Wax

Optionally, a wax may also be used forming toner particles. When included, the wave may be present in an amount of, for example, from about 1 wt % to about 25 wt % of the toner particles, although amounts outside that range may be utilized.

Waxes that may be selected include waxes having, for example, an $M_w$ of from about 500 to about 20,000 although weights outside that range may be utilized.

Toner Preparation

The toner particles may be prepared by any method within the purview of one skilled in the art. Although emulsion-aggregation processes are discussed below, any suitable method of preparing toner particles may be used, including chemical processes, such as, suspension and encapsulation processes, see U.S. Pat. Nos. 5,290,654 and 5,302,486, the disclosure of each of which hereby is incorporated by reference in entirety.

Toner compositions may be prepared by emulsion/aggregation processes, such as, a process that includes aggregating a mixture of a resin, an optional colorant, an optional wax and any other desired or required reagents, where the resin can comprise a polymer resin made as described herein, optionally comprising a surfactant as described above, and then coalescing the aggregated particles. The pH of the resulting mixture may be adjusted by in acid, such as, for example, acetic acid, nitric acid or the like. In embodiments, the pH of the mixture may be adjusted to from about 4 to about 5, although a pH outside that range may be utilized.

Following preparation of the above mixture, an aggregating agent may be added to the mixture to facilitate aggregation of the resin particles. The aggregating agent may be added to the mixture at a temperature that is below the Tg of the resin. The aggregating agent may be added to the mixture utilized to form a toner in an amount of, for example, from about 0.1% to about 8% by weight, although amounts outside that range may be utilized.

Once the predetermined desired particle size is reached, then the growth process is halted.

Following aggregation to the desired particle size, the particles may then be coalesced to the desired final shape, the coalescence being achieved by, for example, heating the mixture to a temperature of from about 65° C. to about 105° C. (although temperatures outside that range may be utilized), which may be at or above the Tg of the resin, and/or increasing the stirring, for example, to from about 400 rpm to about 1,000 rpm, although speeds outside that range may be utilized. Higher or lower temperatures may be used, it being understood that the temperature can be a function of the resins used for the binder. Coalescence may be accomplished over a period of from about 0.1 to about 9 hours, although times outside that range may be utilized.

After aggregation and/or coalescence, the mixture may be cooled to room temperature (RT), such as, from about 20° C. to about 25° C. The cooling may be rapid or slow, as desired. After cooling, the toner particles may be optionally washed with water, and then dried.

Additives

In embodiments, the toner particles may also contain other optional additives, as desired or required. For example, the toner may include positive or negative charge control agents, for example, in an amount of from about 0.1 to about 10% by weight of the toner, although amounts outside that range may be utilized.

The toner particles may be blended with flow aid additives, which additives may be present on the surface of the toner particles. Each of the external additives may be present in an amount of from about 0.1% by weight to about 5% by weight of the toner, although amounts outside that range may be utilized.

Carrier

In embodiments, the toner particles can be mixed with a carrier, which may be coated, to form a two-part developer.

Imaging

The toners may be utilized for electrophotographic or xerographic processes, including those disclosed in U.S. Pat. No. 4,295,990, the disclosure of which is hereby incorporated by reference in entirety. In embodiments, any known type of image development system may be used in an image developing device, including, for example, magnetic brush development, jumping single-component development, hybrid scavengeless development (HSD) and the like. Those and similar development systems are within the purview of those skilled in the art.

The following Examples are submitted to illustrate embodiments, of the present disclosure. The Examples are intended to be illustrative only and are not intended to limit the scope of the present disclosure. Also, parts and percentages are by weight unless otherwise indicated.

EXAMPLES

Example 1

General Procedure for Poly-Lactide Production, DP=50

D,L-lactide (2.0 g, 14 mmoles), DMAP (34 mg, 0.28 mmoles), DMAP:$HO_3SCF_3$ (76 mg, 0.28 mmoles) and benzyl alcohol (29 µl, 30 mg, 0.28 mmoles) were added to a 18×150 mm test tube with a magnetic stir bar and heated to 135° C. For DP=50, the reaction was 95% complete in 5 minutes. For DP=100, DMPA, DMAP:$HO_3SCF_3$ and benzyl alcohol amounts were reduced by a factor of 2. The reaction was 90% complete in 10 minutes. A schematic of the reaction is illustrated in FIG. 2.

In Table 1 for DP=50, the polydispersity index (PDI) was 1.13 at 95% conversion as detected by NMR. DP=100 also yielded a high conversion (i.e., 90%) with a PDI of 1.08. The organocatalytic approach for living ROP of lactide was done neat, without the need for elaborate glassware or an inert gas blanket.

In other experiments, for a DP of 25, 100% conversion of reactants was observed in a three minute reaction. At a DP of 50, 100% conversion was observed after 15 minutes. At a DP of 100, at least 90% conversion was observed at 30 minutes. Longer reaction times increased the conversion percentage.

TABLE 1

Polymerization of D,L-Lactide:DMAP/ DMAP:$HO_3SCF_3$ (neat) at 135° C.

| DP | Time | Mn | Mw | PDI (conversion) |
|---|---|---|---|---|
| 50 | 1 min | 6063 | 6415 | 1.05 |
| 50 | 5 min | 8921 | 10159 | 1.13 (95%) |
| 50 | 10 min | 9532 | 12373 | 1.29 |
| 100 | 5 min | 6950 | 7435 | 1.06 |
| 100 | 10 min | 10429 | 11334 | 1.08 (90%) |
| 100 | 20 min | 13801 | 16678 | 1.20 |

Polymerization of ε-caprolactone by DMAP/DMAP:$HO_3SCF_3$ and benzyl alcohol was conducted similarly, but at 135° C. see Table 2.

TABLE 2

Caprolactone Polymerization using DMAP/DMAP:$HO_3SCF_3$ (neat) and Benzyl Alcohol as the Initiator at 135° C.; Monitored Between 2-43 Hours using GPC.

| DP | Time | Mn | Mw | PDI (notes) |
|---|---|---|---|---|
| 25 | 2 h | — | — | (monomer) |
| 25 | 19 h | 3566 | 4001 | 1.12 |
| 25 | 22 h | 4167 | 4628 | 1.11 |
| 25 | 26 h | 4376 | 5033 | 1.15 |
| 25 | 43 h | 4903 | 6817 | 1.39 |
| 50 | 2 h | — | — | (monomer) |
| 50 | 19 h | 1742 | 1958 | 1.12 |
| 50 | 22 h | 2083 | 2289 | 1.09 |
| 50 | 26 h | 2326 | 2573 | 1.10 |
| 50 | 43 h | 4740 | 5448 | 1.14 |

In other experiments, for a DP of 25, 95% conversion was observed after a 25 hour incubation. For a DP of 50, 98% conversion was observed after a 48 hour reaction.

In Table 3, a commercial sample of polycaprolactone (PCL or CL) was used as the initiator for the polymerization of lactides (PLA or LA) to generate polycaprolactone-b-polylactide block copolymers. Gel permeation chromatography (GPC) showed high molecular weight copolymers were produced with low polydispersity.

TABLE 3

Polycaprolactone-b-polylactide Copolymer using DMAP/DMAP:$HO_3SCF_3$ (135° C., neat) and Polycaprolactone (Aldrich, MW = 10,000) as the initiator.

| DP | Time | Mn | Mw | PDI |
|---|---|---|---|---|
| 0 (PCL) | | 20233 | 28504 | 1.40 |
| 100 | 5 min | 23897 | 31842 | 1.33 |
| 100 | 10 min | 27163 | 34587 | 1.27 |
| 100 | 20 min | 30485 | 37578 | 1.23 |
| 100 | 40 min | 34287 | 41167 | 1.20 |
| 200 | 5 min | 24937 | 32438 | 1.30 |
| 200 | 20 min | 29558 | 36391 | 1.23 |
| 200 | 40 min | 35821 | 42246 | 1.17 |
| 200 | 60 min | 39017 | 45670 | 1.17 |

Example 2

General Procedure for Polymerization of Polycaprolactone-b-Polylactide Copolymer (PCL DP=25, PLA DP=25, 50, 100)

Into a 16×150 mm test tube with a magnetic stir bar were added caprolactone (CL) (1.6 g), DMAP (68 mg), DMAP:HO$_3$SCF$_3$ (152 mg) and benzyl alcohol (60 µl). The mixture was heated to 135° C. for 24 hours. To the heated mixture was added lactide (25 mer=2.3 g, 50 mer=4.6 g and 100 mer=9.2 g) and the mixture was heated to the same temperature.

Table 4 shows the results for polycaprolactone-b-polylactide copolymers made using DMAP/DMAP:HX catalyst to generate different block sizes in a one-pot reaction. Both the monomer:initiator (M/I)=25 and M/I=50 reactions effectively produced polymer when heated to 135° C.

TABLE 4

Polycaprolatone-b-Polylactide Copolymer: 135° C./135° C. using DMAP/DMAP:HO$_3$SCF$_3$ for Caprolactone (DP = 25) and Lactide (DP = 25, 50 and 100)).

| DP Lactide | Time | Mn | Mw | PDI |
|---|---|---|---|---|
| 0 (PCL) | 0 | 2915 | 3416 | 1.17 |
| 25 | 5 min | 5467 | 6082 | 1.11 |
| 25 | 10 min | 6196 | 7220 | 1.16 |
| 25 | 20 min | 6446 | 7789 | 1.20 |
| 25 | 40 min | 5944 | 7655 | 1.28 |
| 25 | 60 min | 6076 | 7902 | 1.30 |
| 50 | 5 min | 5827 | 6434 | 1.10 |
| 50 | 10 min | 7705 | 8682 | 1.12 |
| 50 | 20 min | 7895 | 9767 | 1.23 |
| 50 | 40 min | 9125 | 12000 | 1.31 |
| 50 | 60 min | 8946 | 12689 | 1.41 |
| 100 | 5 min | 4435 | 5298 | 1.19 |
| 100 | 10 min | 6226 | 7054 | 1.13 |
| 100 | 20 min | 7303 | 8246 | 1.12 |
| 100 | 40 min | 9706 | 11865 | 1.22 |
| 100 | 60 min | 11169 | 14258 | 1.27 |

Table 5 provides properties of two polycaprolactone-b-polylactide block copolymers, which were characterized by GPC and H-NMR to show high conversion and polydispersity under 1.3.

TABLE 5

Polycaprolactone (DP = 25)-b-Polylactide Copolymer.

| M/I Lactide | Time | Mn | Mw | PDI | H-NMR |
|---|---|---|---|---|---|
| 25 | 15 min | 10075 | 11861 | 1.17 | 20% CL remains<br>7% LA remains<br>PCL:PLA = 1.5:2.0 |
| 50 | 30 min | 12893 | 16191 | 1.25 | 16% CL remains<br>13% LA remains<br>PCL:PLA = 1.0:2.0 |

Example 3

Poly-Lactide Production Using 2-Phenylethanol as Initiator

The materials and methods of Example 1 were practiced except that the benzyl alcohol was replaced by 2-phenylethanol (0.28 mmoles). M$_p$ is the peak molecular weight.

TABLE 6

2-Phenylethanol Initiator and DMAP/DMAP:HO$_3$SCF$_3$ Catalyst, DP = 25

| Time (min) | M$_n$ | M$_w$ | M$_p$ | PDI | % Conversion |
|---|---|---|---|---|---|
| 1 | 4007 | 4341 | 4304 | 1.08 | 80% |
| 2 | 4891 | 5410 | 5354 | 1.10 | 88% |
| 3 | 5199 | 5896 | 5583 | 1.13 | 89% |
| 4 | 5451 | 6344 | 5920 | 1.16 | 89% |

TABLE 7

2-Phenylethanol Initiator and DMAP/DMAP:HO$_3$SCF$_3$ Catalyst, DP = 50

| Time (min) | M$_n$ | M$_w$ | M$_p$ | PDI | % Conversion |
|---|---|---|---|---|---|
| 1 | 3849 | 4218 | 4269 | 1.09 | 47% |
| 3 | 6790 | 7317 | 7252 | 1.07 | 74% |
| 5 | 8207 | 9083 | 8630 | 1.10 | 83% |
| 10 | 10180 | 11812 | 10589 | 1.16 | 90% |
| 15 | 10445 | 13529 | 10756 | 1.29 | 94% |

TABLE 8

2-Phenylethanol Initiator and DMAP/DMAP:HO$_3$SCF$_3$ Catalyst, DP = 100

| Time (min) | M$_n$ | M$_w$ | M$_p$ | PDI | % Conversion |
|---|---|---|---|---|---|
| 1 | 2347 | 2835 | 2808 | 1.20 | 23% |
| 5 | 5584 | 6096 | 6053 | 1.09 | 42% |
| 15 | 11301 | 12831 | 11642 | 1.13 | 73% |
| 30 | 14705 | 18310 | 14743 | 1.24 | 86% |
| 40 | 15639 | 21170 | 16913 | 1.35 | 91% |

Example 4

Poly-Lactide Production Using 1-Hexanol as Initiator

The materials and methods of Example 1 were practiced except that the benzyl alcohol was replaced by 1-hexanol (0.28 mmoles).

TABLE 9

1-Hexanol Initiator and DMAP/DMAP:HO$_3$SCF$_3$ Catalyst, DP = 25

| Time (min) | M$_n$ | M$_w$ | M$_p$ | PDI | % Conversion |
|---|---|---|---|---|---|
| 1 | 3159 | 3466 | 3472 | 1.09 | 74% |
| 2 | 4802 | 5201 | 5151 | 1.08 | 88% |
| 3 | 5217 | 5747 | 5328 | 1.10 | 92% |
| 4 | 5461 | 6305 | 5614 | 1.15 | 92% |

TABLE 10

1-Hexanol Initiator and DMAP/
DMAP:$HO_3SCF_3$ Catalyst, DP = 50

| Time (min) | $M_n$ | $M_w$ | $M_p$ | PDI | % Conversion |
|---|---|---|---|---|---|
| 1 | 3003 | 3251 | 3108 | 1.08 | 41% |
| 3 | 5961 | 6411 | 6436 | 1.07 | 64% |
| 5 | 7462 | 8127 | 7548 | 1.09 | 81% |
| 10 | 9562 | 11238 | 9697 | 1.17 | 93% |
| 15 | 10344 | 13397 | 10385 | 1.29 | 95% |

TABLE 11

1-Hexanol Initiator and DMAP/
DMAP:$HO_3SCF_3$ Catalyst DP = 100

| Time (min) | $M_n$ | $M_w$ | $M_p$ | PDI | % Conversion |
|---|---|---|---|---|---|
| 5 | 5232 | 5661 | 5513 | 1.08 | 18% |
| 10 | 8226 | 8953 | 8342 | 1.08 | 33% |
| 15 | 11031 | 12390 | 11185 | 1.12 | 50% |
| 20 | 13028 | 15195 | 13181 | 1.16 | 69% |
| 40 | 16862 | 22227 | 18113 | 1.31 | 90% |

Example 5

Poly-Lactide Production Using HCl as the Catalyst Component

The materials and methods of Example 1 were practiced except that the triflic acid of the catalyst was replaced by hydrochloric acid.

TABLE 12

Benzyl Alcohol Initiator and DMAP/DMAP:HCl Catalyst, DP = 25

| Time (min) | $M_n$ | $M_w$ | $M_p$ | PDI | % Conversion |
|---|---|---|---|---|---|
| 5 | 3226 | 3574 | 3477 | 1.11 | 90% |
| 10 | 4165 | 4833 | 4254 | 1.16 | 95% |
| 15 | 4306 | 5242 | 4452 | 1.22 | 95% |

TABLE 13

Benzyl Alcohol Initiator and DMAP/DMAP:HCl Catalyst, DP = 50

| Time (min) | $M_n$ | $M_w$ | $M_p$ | PDI | % Conversion |
|---|---|---|---|---|---|
| 1 | 1240 | 1408 | 1393 | 1.13 | 40.5% |
| 5 | 3561 | 3946 | 3679 | 1.11 | 84.7% |
| 10 | 5237 | 5986 | 5275 | 1.14 | 97% |
| 15 | 6089 | 7121 | 6041 | 1.17 | 98% |

TABLE 14

Benzyl Alcohol Initiator and DMAP/
DMAP:HCl Catalyst, DP = 100

| Time (min) | $M_n$ | $M_w$ | $M_p$ | PDI | % Conversion |
|---|---|---|---|---|---|
| 5 | 2187 | 2435 | 2314 | 1.11 | 40.2% |
| 15 | 5082 | 5886 | 5251 | 1.16 | 73.5% |
| 30 | 7979 | 9839 | 7933 | 1.23 | 97.1% |

TABLE 15

2-Phenylethanol Initiator and
DMAP/DMAP:HCl Catalyst, DP = 25

| Time | $M_n$ | $M_w$ | $M_p$ | PDI | % Conversion |
|---|---|---|---|---|---|
| 1 | 1600 | 1790 | 1714 | 1.11 | 57% |
| 5 | 3799 | 4270 | 4181 | 1.12 | 82% |
| 10 | 4355 | 5157 | 4648 | 1.18 | 89% |
| 15 | 4451 | 5617 | 4914 | 1.26 | 90% |

TABLE 16

2-Phenylethanol Initiator and
DMAP/DMAP:HCl Catalyst, DP = 50

| Time | $M_n$ | $M_w$ | $M_p$ | PDI | % Conversion |
|---|---|---|---|---|---|
| 1 | 1876 | 2085 | 1961 | 1.11 | 35% |
| 5 | 5043 | 5518 | 5311 | 1.09 | 67% |
| 10 | 6917 | 7674 | 7042 | 1.10 | 78% |
| 15 | 7713 | 8963 | 7670 | 1.16 | 86% |
| 25 | 8345 | 10452 | 8787 | 1.25 | 91% |

TABLE 17

2-Phenylethanol Initiator and DMAP/
DMAP:HCl Catalyst, DP = 100

| Time | $M_n$ | $M_w$ | $M_p$ | PDI | % Conversion |
|---|---|---|---|---|---|
| 1 | 1353 | 1709 | 1728 | 1.26 | 20% |
| 5 | 3247 | 3612 | 3604 | 1.11 | 38% |
| 10 | 5047 | 5633 | 5319 | 1.11 | 51% |
| 15 | 6515 | 7427 | 6529 | 1.14 | 61% |
| 20 | 7685 | 9056 | 7953 | 1.17 | 69% |
| 30 | 9391 | 11930 | 9578 | 1.27 | 80% |
| 40 | 10611 | 13895 | 11150 | 1.30 | 82% |

TABLE 18

Hexanol Initiator and DMAP/DMAP:HCl Catalyst, DP = 25

| Time (min) | $M_n$ | $M_w$ | $M_p$ | PDI | % Conversion |
|---|---|---|---|---|---|
| 1 | 1957 | 2169 | 2103 | 1.10 | 54% |
| 5 | 4083 | 4596 | 4342 | 1.12 | 89% |
| 10 | 4510 | 5364 | 4649 | 1.19 | 94% |
| 15 | 4648 | 5975 | 4935 | 1.28 | 94% |

TABLE 19

Hexanol Initiator and DMAP/DMAP:HCl Catalyst, DP = 50

| Time (min) | $M_n$ | $M_w$ | $M_p$ | PDI | % Conversion |
|---|---|---|---|---|---|
| 1 | 1864 | 2082 | 2049 | 1.11 | 27% |
| 5 | 4667 | 5161 | 4908 | 1.10 | 67% |
| 10 | 6505 | 7368 | 6647 | 1.13 | 82% |
| 15 | 7252 | 8574 | 7363 | 1.18 | 87% |
| 20 | 7763 | 9629 | 7681 | 1.24 | 91% |
| 25 | 7741 | 10056 | 7785 | 1.29 | 91% |

TABLE 20

Hexanol Initiator and DMAP/DMAP:HCl Catalyst, DP = 100

| Time (min) | $M_n$ | $M_w$ | $M_p$ | PDI | % Conversion |
|---|---|---|---|---|---|
| 1 | 1607 | 1832 | 1789 | 1.14 | 15% |
| 5 | 3122 | 3475 | 3464 | 1.11 | 30% |
| 10 | 4786 | 5382 | 4976 | 1.12 | 43% |
| 15 | 6168 | 7097 | 6394 | 1.15 | 53% |
| 20 | 7382 | 8737 | 7679 | 1.18 | 62% |
| 30 | 9019 | 11424 | 9576 | 1.26 | 77% |
| 40 | 9998 | 13308 | 10610 | 1.33 | 83% |
| 50 | 10311 | 14498 | 11695 | 1.40 | 87% |
| 60 | 10426 | 15017 | 12500 | 1.44 | 91% |

Example 6

Poly-Caprolactone Production Using Hexanol as Initiator

The materials and methods of Example 1 were practiced to produce polycaprolactone polymer but using hexanol rather than benzyl alcohol as the initiator.

TABLE 21

Hexanol Initiator and DMAP/DMAP:$HO_3SCF_3$ Catalyst, DP = 25

| Time (hours) | $M_n$ | $M_w$ | $M_p$ | PDI |
|---|---|---|---|---|
| 13 | 2969 | 3434 | 3266 | 1.15 |
| 16 | 3678 | 4264 | 3850 | 1.16 |
| 21 | 3994 | 5287 | 4938 | 1.32 |

TABLE 22

Hexanol Initiator and DMAP/DMAP:$HO_3SCF_3$ Catalyst, DP = 50

| Time (hours) | $M_n$ | $M_w$ | $M_p$ | PDI |
|---|---|---|---|---|
| 13 | 1408 | 1688 | 1645 | 1.19 |
| 16 | 1889 | 2165 | 2059 | 1.14 |
| 21 | 2537 | 3085 | 3025 | 1.21 |
| 26 | 3340 | 4298 | 4196 | 1.28 |

Example 6

Poly-Caprolactone Production Using HCl as the Catalyst Component

The materials and methods of Example 1 were practiced except that the triflic acid of the catalyst was replaced by hydrochloric acid.

TABLE 23

Benzyl Alcohol Initiator and DMAP/DMAP:HCl Catalyst, DP = 25

| Time (hours) | $M_n$ | $M_w$ | $M_p$ | PDI |
|---|---|---|---|---|
| 18 | 1617 | 1855 | 1803 | 1.15 |
| 21 | 1872 | 2189 | 2150 | 1.17 |
| 24 | 2170 | 2535 | 2480 | 1.17 |
| 72 | 3416 | 5003 | 5133 | 1.46 |

TABLE 24

Benzyl Alcohol Initiator and DMAP/DMAP:HCl Catalyst, DP = 50

| Time (hours) | $M_n$ | $M_w$ | $M_p$ | PDI |
|---|---|---|---|---|
| 18 | 1374 | 1615 | 1548 | 1.17 |
| 24 | 2134 | 2462 | 2422 | 1.15 |
| 72 | 4787 | 7527 | 7037 | 1.57 |

Example 7

Poly-Caprolactone Production Using Hexanol at the Initiator and HCl as the Catalyst Component The materials and methods of Example 1 were practiced except that the benzyl alcohol was replaced by hexanol and triflic acid of the catalyst was replaced by hydrochloric acid.

TABLE 25

Hexanol Initiator and DMAP/DMAP:HCl Catalyst, DP = 25

| Time (hours) | $M_n$ | $M_w$ | $M_p$ | PDI |
|---|---|---|---|---|
| 21 | 1370 | 1635 | 1684 | 1.19 |
| 26 | 1933 | 2309 | 2396 | 1.19 |
| 40 | 2982 | 3866 | 3736 | 1.29 |

TABLE 26

Hexanol Initiator and DMAP/DMAP:HCl Catalyst, DP = 50

| Time (hours) | $M_n$ | $M_w$ | $M_p$ | PDI |
|---|---|---|---|---|
| 21 | 1156 | 1378 | 1435 | 1.19 |
| 26 | 1816 | 2112 | 2121 | 1.16 |
| 40 | 3492 | 4381 | 4223 | 1.25 |

Example 8

Polymerization of Polycaprolactone-b-Polylactide Copolymer

The materials and methods of Example 2 were practiced to generate block copolymers of defined content.

TABLE 27

PCL-b-PLA Block Copolymers

| Samples | $M_n$ | $M_w$ | $M_p$ | PDI |
|---|---|---|---|---|
| $PCL_{25}$ initiator | 3719 | 4464 | 4340 | 1.20 |
| $PCL_{25}$-$PLA_{25}$ | 6335 | 7375 | 7030 | 1.16 |
| $PCL_{25}$-$PLA_{50}$ | 7743 | 9627 | 8423 | 1.24 |
| $PCL_{25}$-$PLA_{100}$ | 14308 | 16988 | 15392 | 1.18 |

It will be appreciated that several of the above-disclosed and other features and functions, or alternatives thereof, may be desirably combined with other different systems or applications. Also various presently unforeseen or unanticipated alternatives, modifications, variations or improvements therein may be subsequently made by those skilled in the art, which are also intended to be encompassed by the following claims. Unless specifically recited in a claim, steps or components of claims as to any particular order, number, position, size, shape, angle, color or material.

All references cited herein are incorporated by reference in their entireties.

We claim:

1. A ring opening polymerization (ROP) process comprising:
   contacting a first cyclic component with a catalyst and an initiator;
   heating the first cyclic component, catalyst and initiator from about 100° C. to about 165° C. to polymerize the first cyclic component to form a homopolymer; and
   contacting said homopolymer with a second cyclic component to form a copolymer,
   wherein the contacting and heating occur under neat conditions, without an inert gas blanket, in a single vessel.

2. The ROP process of claim 1, wherein said contacting and heating steps occur under ambient humidity or standard pressure.

3. The ROP process of claim 1, wherein the first and second cyclic components are selected from the group consisting of glycolide, β-propiolactone, β-butyrolactone, γ-butyrolactone, γ-valerolactone, ε-caprolactone, D,D-lactide, L,L-lactide, D,L-lactide, trimethylenecarbonate (TMC), 2-benzyloxy-trimethylenecarbonate (BTMC), 2-hydroxy-trimethylenecarbonate (TMCOH), 4-(benzyloxymethyl)-1,3-dioxolan-2-one (BDMC), 4-(hydroxymethyl)-1,3-dioxolan-2-one (DMCOH), 2-oxy-trimethylenecarbonate (OTMC), dehydrotrimethylenecarbonate (DHTMC) and 2,2 dimethoxy trimethylene carbonate (TMC(OMe)$_2$), succinic anhydride, glutaric anhydride, maleic anhydride, trimethylene carbonate, carboxy-trimethylene carbonate and esters thereof, styrene oxide, cyclohexene oxide, 4-(sulfonatophenyl)caprolactone, cyclopentane-1,2-dicarboxylic anhydride, cyclohexene-1,2-dicarboxylic anhydride and 2,3-bicyclo[2,2,2]octadicarboxylic anhydride, phthalic anhydride, naphthalene-dicarboxylic anhydride, pyridine-dicarboxylic anhydride, thiophene-dicarboxylic anhydride and combinations thereof.

4. The ROP process of claim 1, wherein the catalyst comprises two components that operate in a nucleophilic transesterification reaction.

5. The ROP process of claim 4, wherein the catalyst comprises 4-(dimethylamino)pyridine (DMAP) and DMAP:HX, wherein HX is selected from the group consisting of HCl, HBr, sulfuric acid, nitric acid, phosphoric acid, formic acid, acetic acid, methyl sulfonic acid, trifluoroacetic acid, trichloroacetic acid, triflic acid and combinations thereof.

6. The ROP process of claim 5, wherein HX comprises triflic acid.

7. The ROP process of claim 1, wherein the initiator comprises a monoalcohol.

8. The ROP process of claim 1, wherein the initiator is selected from the group consisting of methyl alcohol, ethyl alcohol, propyl alcohol, allyl alcohol, cyclo-hexanol, furfuryl alcohol, benzyl alcohol, trifluoroethanol, heptafluorobutanol, heptadecylfluorooctanol, pentafluoropropanol, pentafluorobutanol, nonafluorohexanol and fluoroalkylethanols.

9. The ROP process of claim 1, wherein said first cyclic component is an anhydride, a carbonate or an epoxide.

10. The ROP process of claim 1, wherein said second cyclic component is an anhydride, a carbonate or an epoxide.

11. The ROP process of claim 1, wherein the resulting copolymer resin comprises a polydispersity of less than about 1.3.

12. The ROP process of claim 1, wherein the resulting copolymer resin comprises an Mw from about 950 to about 50,000.

13. The ROP process of claim 1, wherein the first cyclic component comprises an ε-caprolactone and the second cyclic component comprises a lactide.

14. The ROP process of claim 1, wherein the initiator comprises a benzyl alcohol.

15. The ROP process of claim 1, further comprising adding a third cyclic component in said second contacting step or to said copolymer in said single vessel.

16. The ROP process of claim 1, wherein the resulting copolymer resin comprises a Mn from about 800 to about 20,000.

17. A process comprising;
   contacting a first cyclic component with a catalyst and an initiator, and
   heating the first cyclic component, catalyst and initiator from about 100° C. to about 165° C. to polymerize the first cyclic component to form a homopolymer, and
   contacting said homopolymer with a second cyclic component to form a copolymer, wherein the first and second cyclic components are selected from the group consisting of glycolide, β-propiolactone, β-butyrolactone, γ-butyrolactone, γ-valerolactone, ε-caprolactone, D,D-lactide, L,L-lactide, D,L-lactide, trimethylenecarbonate (TMC), 2-benzyloxy-trimethylenecarbonate (BTMC), 2-hydroxy-trimethylenecarbonate (TMCOH), 4-(benzyloxymethyl)-1,3-dioxolan-2-one (BDMC), 4-(hydroxymethyl)-1,3-dioxolan-2-one (DMCOH), 2-oxy-trimethylenecarbonate (OTMC), dehydrotrimethylenecarbonate (DHTMC) and 2,2 dimethoxy trimethylene carbonate (TMC(OMe)$_2$), succinic anhydride, glutaric anhydride, maleic anhydride, trimethylene carbonate, carboxy-trimethylene carbonate and esters thereof, styrene oxide, cyclohexene oxide, 4-(sulfonatophenyl)caprolactone, cyclopentane-1,2-dicarboxylic anhydride, cyclohexene-1,2-dicarboxylic anhydride and 2,3-bicyclo[2,2,2]octadicarboxylic anhydride, phthalic anhydride, naphthalene-dicarboxylic anhydride, pyridine-dicarboxylic anhydride, thiophene-dicarboxylic anhydride and combinations thereof; and
   wherein the contacting and heating occur under neat conditions, without an inert gas blanket, in a single vessel under standard pressure and ambient humidity.

18. The process of claim 17, wherein said contacting and heating steps occur under ambient humidity or standard pressure.

19. The process of claim 16, wherein the catalyst comprises 4-(dimethylamino)pyridine (DMAP) and DMAP:HX, wherein HX is selected from the group consisting of HCl, HBr, sulfuric acid, nitric acid, phosphoric acid, formic acid, acetic acid, trifluoroacetic acid, methyl sulfonic acid, trichloroacetic acid, triflic acid, and combinations thereof.

20. The process of claim 19, wherein HX is triflic acid.

* * * * *